US011305252B2

(12) United States Patent
Orme et al.

(10) Patent No.: US 11,305,252 B2
(45) Date of Patent: Apr. 19, 2022

(54) SYSTEM, METHOD, AND APPARATUS RELATING TO COLLOIDOSOMES

(71) Applicants: LAWRENCE LIVERMORE NATIONAL SECURITY, LLC, Livermore, CA (US); CARNEGIE MELLON UNIVERSITY, Pittsburgh, PA (US)

(72) Inventors: Christine A Orme, Oakland, CA (US); Sarah Baker, Dublin, CA (US); Yixuan Yu, Livermore, CA (US); Shelley L Anna, Pittsburgh, PA (US); Charles Sharkey, Glen Head, NY (US)

(73) Assignees: Lawrence Livermore National Security, LLC, Livermore, CA (US); Carnegie Mellon University, Pittsburgh, PA (US)

(*) Notice: Subject to any disclaimer, the term of this patent is extended or adjusted under 35 U.S.C. 154(b) by 177 days.

(21) Appl. No.: 16/757,972

(22) PCT Filed: Oct. 24, 2018

(86) PCT No.: PCT/US2018/057341
§ 371 (c)(1),
(2) Date: Apr. 21, 2020

(87) PCT Pub. No.: WO2019/084159
PCT Pub. Date: May 2, 2019

(65) Prior Publication Data
US 2020/0290004 A1    Sep. 17, 2020

Related U.S. Application Data

(60) Provisional application No. 62/577,366, filed on Oct. 26, 2017.

(51) Int. Cl.
*B01J 13/08* (2006.01)
*B01J 13/20* (2006.01)
(Continued)

(52) U.S. Cl.
CPC .............. *B01J 13/08* (2013.01); *B01J 13/04* (2013.01); *B01J 13/206* (2013.01); *B01J 23/83* (2013.01);
(Continued)

(58) Field of Classification Search
None
See application file for complete search history.

(56) References Cited

U.S. PATENT DOCUMENTS 7,875,654 B2    1/2011   Hong et al.
2013/0302613 A1*  11/2013  Gauckler ............... B01J 13/20
                                                    428/402.2
(Continued)

FOREIGN PATENT DOCUMENTS

EP    2865443 A1    4/2015

OTHER PUBLICATIONS

Duan, H. et al., "Magnetic colloidosomes derived from nanoparticle interfacial self-assembly", NANO Letters, 2005, vol. 5, No. 5, pp. 949-952.
(Continued)

*Primary Examiner* — Jeffrey D Washville
(74) *Attorney, Agent, or Firm* — Eddie E. Scott

(57) ABSTRACT

An ultra low density film and an ultra low density solid material are produced by the steps of providing a vessel, introducing two immiscible fluids into the vessel, adding nanocrystals to at least one of the two immiscible fluids, applying a shear force to the two immiscible fluids and the nanocrystals in a manner that causes the nanocrystals to self-assemble and form colloidosomes. The colloidosomes
(Continued)

amass and evaporation of the two fluids produces dried colloidosomes. The ultra low density self-assembled colloidosomes are hollow self-assembled colloidosomes, which are formed into the ultra-low density film and the ultra-low density solid.

17 Claims, 10 Drawing Sheets

(51) Int. Cl.
  *B01J 23/83* (2006.01)
  *B01J 35/00* (2006.01)
  *B01J 37/00* (2006.01)
  *B01J 37/34* (2006.01)
  *C01G 51/00* (2006.01)
  *B01J 13/04* (2006.01)

(52) U.S. Cl.
  CPC ....... *B01J 35/0013* (2013.01); *B01J 37/0009* (2013.01); *B01J 37/009* (2013.01); *B01J 37/0072* (2013.01); *B01J 37/342* (2013.01); *C01G 51/70* (2013.01)

(56) References Cited

U.S. PATENT DOCUMENTS

2015/0102265 A1* 4/2015 Russell ............... B01F 17/0028
                                                          252/500
2017/0165199 A1   6/2017 Prestidge et al.

OTHER PUBLICATIONS

International Search Report and Written Opinion for PCT/US2018/057341 corresponding to U.S. Appl. No. 16/757,972, 12 pages.

* cited by examiner

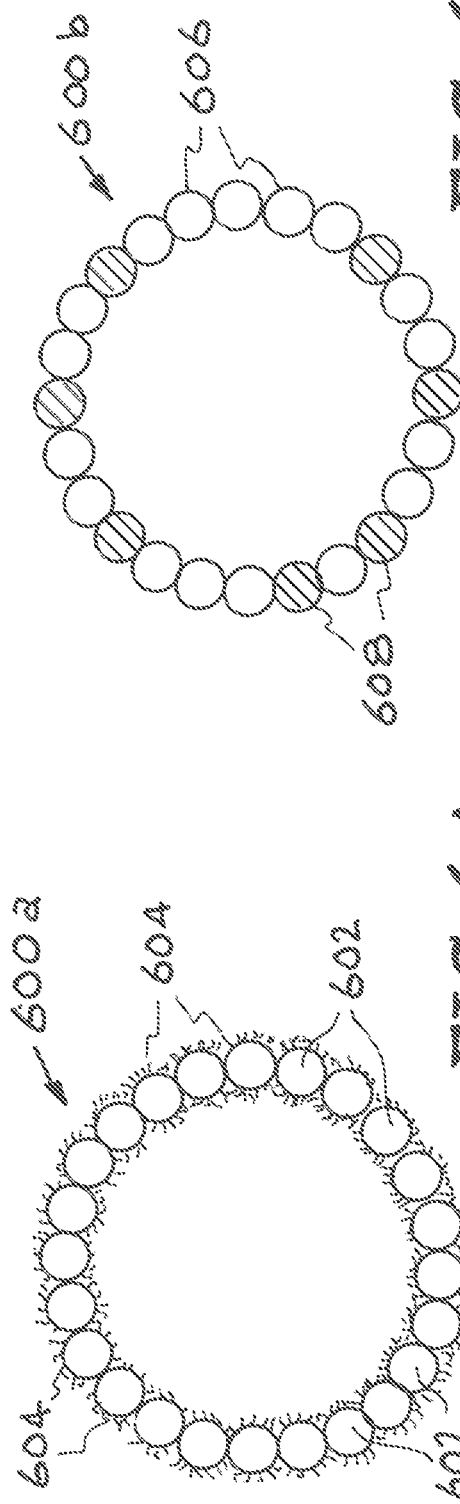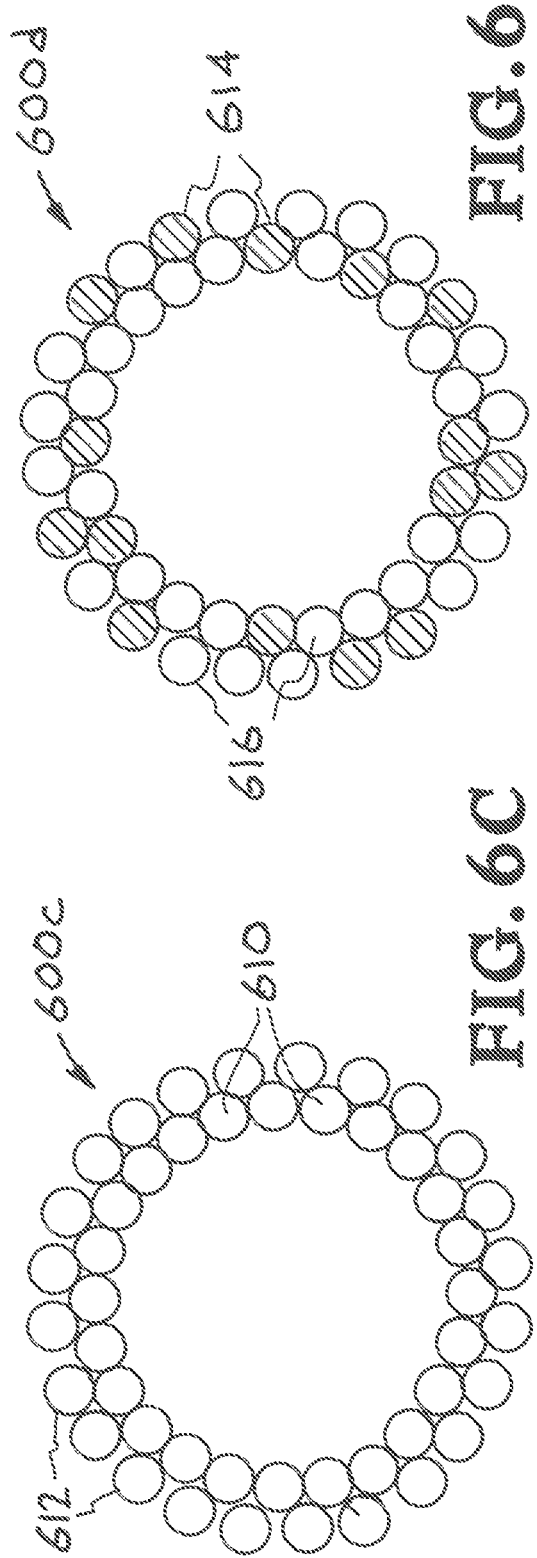

SYSTEM, METHOD, AND APPARATUS RELATING TO COLLOIDOSOMES

CROSS-REFERENCE TO RELATED APPLICATIONS

This application claims priority to and benefit under 35 U.S.C. § 119(e) of U.S. Provisional Patent Application No. 62/577,366 filed Oct. 26, 2017 entitled "Ultra-Low Density Solids Formed From Colloidosomes," the content of which is hereby incorporated by reference in its entirety for all purposes.

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present writing relates to low density material and more particularly to low density films made of colloidosomes and low density materials made of colloidosomes. The present writing as well relates to ultra-low density materials formed from colloidosomes.

State of Technology

This section provides background information related to the present disclosure which is not necessarily prior art.

One of the most notable advances in materials science in the past two decades has been the ability to synthesize nanomaterials with a high degree of refinement over the composition, size, and shape. Although there remain significant challenges, it is clear that nanoparticles and nanocrystals have become important building blocks for the discovery of materials with new functionality. The next challenge then comes in organizing these building blocks into useful mesostructures. At one extreme are superlattices, dense materials composed of nanoparticles in a crystalline array, at the other extreme, are highly rarefied nanocrystal structures.

Rarefied materials composed of nanocrystals have potential use in applications such as catalysis and sensors due to their high surface area and tunability. For their broadest use, it is desirable to be able to make composites composed of multiple materials (such as multiple types of metal or metal oxides and metal sulfides) where the size of each nanocrystal type can be optimized and the compositions can be systematically varied and distributed throughout the porous structure. However, it is challenging to synthesize multicomponent porous materials in which 1) the individual nanocrystals are optimized (for size, shape etc); 2) the nanocrystals are well-dispersed and 3) the compositions of multiple materials can be systematically varied.

Current synthetic methods provide inexact control on crystallization, oxidation states, phase separation, and dispersion. For example, a typical synthetic method for many porous catalysts utilizes solution impregnation of a porous scaffold such as alumina, with metal salts. The solutions are then dried and processed in reducing or sulfiding environments to nucleate and grow nanocrystals. It is difficult to find processing conditions that simultaneously optimizes the growth, stoichiometry and distribution of multiple materials using such protocols.

Similarly, aerogels are an example of rarefied nanocrystal materials that have been made from many metal oxides, metal sulfides, carbon and to a lesser extent metals. However, the bulk of these materials are single compositions. To synthesize multicomponent materials requires post processing steps that impregnate the aerogel with solutions or gases as is done for alumina scaffolds described above. For this reason, these materials have the same limitations on composition and dispersion control.

Overall, it remains a synthetic challenge to make materials that simultaneously optimizes the nanocrystals and the nanocrystal distribution within a porous material, particularly for multicomponent materials.

SUMMARY

Features and advantages of the disclosed apparatus, systems, and methods will become apparent from the following description. This description, which includes drawings and examples of specific embodiments, is to give a broad representation of the apparatus, systems, and methods. Various changes and modifications within the scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the scope of the apparatus, systems, and methods as defined by the claims.

The inventors' have developed a porous material composed of nanocrystals, including an ultra-low density material. In various embodiments the inventors' apparatus, systems and methods provide an ultra-low density (<0.1%) metal, metal-oxide, semiconductor, or organic porous films. The method enables density & composition gradients as well as multicomponent well solids. The invention utilizes the formation of nanocrystal stabilized emulsions and uses sedimentation, centrifugation or electrophoretic deposition to deposit these into films or solids.

In one embodiment the ultra low density material is a film made of colloidosomes. In another embodiment the ultra low density material is a solid or powder made of colloidosomes. Here we use the term, colloidosomes to mean hollow spheres where the walls are composed of nanocrystals. The film and the solid are produced by steps that include introducing two immiscible fluids into a vessel, adding nanocrystals to at least one of the two immiscible fluids, applying a shear force to the two immiscible fluids and the nanocrystals in a manner that causes the nanocrystals to self-assemble and form colloidosomes, amassing the colloidosomes, and producing dried, hollow colloidosomes that are building blocks to make low density materials including ultra-low density material.

In one embodiment colloidosomes are formed in solution within a vessel and allowed to amass onto a surface by sedimentation or by centrifugation. In the case of sedimentation, the step of enabling the colloidosomes to amass and produce dried colloidosomes includes the steps of allowing evaporation or removal of the two immiscible fluids and allowing gravity and surface tension to amass and produce the dried colloidosomes on a substrate or in the lower portion of the vessel. In the case of centrifugation, the colloidosome solution is centrifuged at a speed sufficiently high to settle the colloidosome material but sufficiently low to prevent breakage of the colloidosomes. The supernatant is then removed and the fluid remaining inside the colloidosomes is allowed to evaporate to produce dried colloidosome material.

In another embodiment the step of enabling the colloidosomes to amass and produce dried colloidosomes includes the steps of providing a first electrode in the vessel, providing a second electrode in the vessel, and energizing the first electrode and the second electrode to generate an electric field. Colloidosomes with a net charge will migrate to the first electrode and produce a nanocrystal accumulate on the first electrode to make the ultra-low density film or material. Dried colloidosome films are generated by removing the electrode from solution and allowing the fluid remaining inside the colloidosomes to evaporate.

In various embodiments the colloidosomes are produced with nanocrystals of a single material, nanocrystals of combinations of nanocrystals materials, colloidosomes with single layers of nanocrystals, and colloidosomes multiple layers of nanocrystals.

The inventors' apparatus, systems, and methods have many advantages including the advantages listed and described below. The invented method provides a higher degree of control over the growth and a greater tunability of the final product, including the advantages listed and then described below.

(1) The invented method is estimated to make porous solids with specific surface areas 100-250 m2/g and % specific densities that span 0.01% to 10%.

(2) The process is compatible with nanocrystals composed of a wide range of materials including but not limited to oxides, metals, semiconductors, organics, and combinations of these.

(3) The invented method is fast, scalable, and compatible with device integration. Film deposition times of microns per seconds over cm2 areas have been demonstrated. The area is limited only by the emulsion volume and the electrode size, both of which have been demonstrated at industrial scales. Films deposit due to an applied field and thus can be patterned onto electrodes.

(4) The invented method has specific advantages for heterogeneous catalysts, which require multiple catalysts to drive a cascade of catalytic steps. First, multicomponent compositions can be tuned, which enables catalyst optimization. Second, catalysts can be well-dispersed throughout the structure, which increases efficiency.

The inventors' apparatus, systems, and methods have many uses. For example, the inventors' apparatus, systems, and methods have use as insulating materials, catalysts, sensor, battery electrodes, and other uses.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

FIG. 6A is a simplified schematic depiction that illustrates one embodiment of the colloidosomes produced by the inventor's apparatus, systems, and methods.

FIG. 6B is a simplified schematic depiction that illustrates another embodiment of the colloidosomes produced by the inventor's apparatus, systems, and methods.

FIG. 6C is a simplified schematic depiction that illustrates yet another embodiment of the colloidosomes produced by the inventor's apparatus, systems, and methods.

FIG. 6D is a simplified schematic depiction that illustrates yet another embodiment of the colloidosomes produced by the inventor's apparatus, systems, and methods.

DETAILED DESCRIPTION OF SPECIFIC EMBODIMENTS

Figure 1:
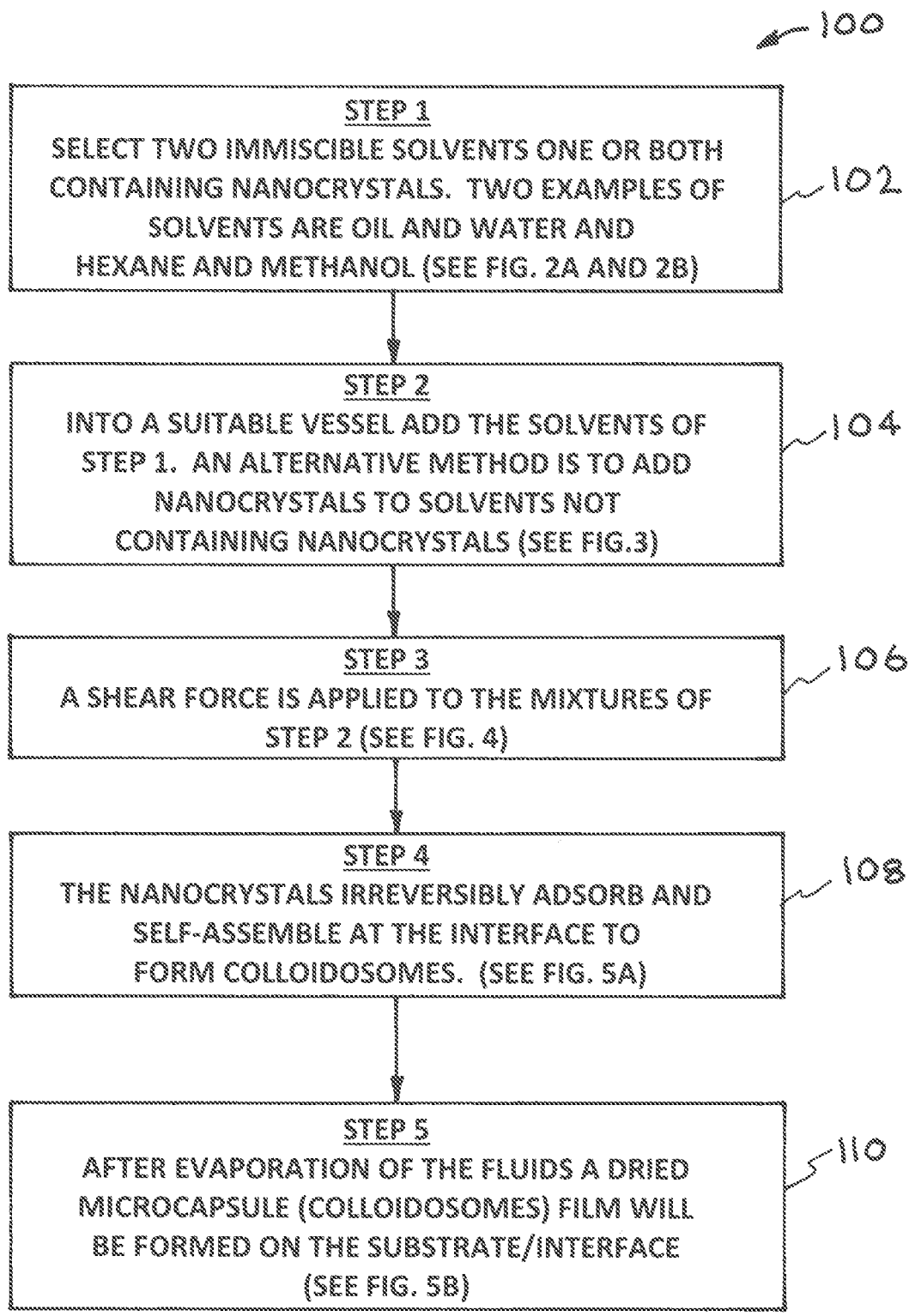
FIG. 1 is a flow chart that provides one illustrative example embodiment of the inventor's apparatus, systems, and methods.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the scope of the apparatus, systems, and methods as defined by the claims.

The inventor's apparatus, systems, and methods are described and illustrated by examples of apparatus, systems, and methods constructed in accordance with the present invention. Various changes and modifications of these examples will be apparent to those skilled in the art from the description of the examples and by practice of the invention. The scope of the invention is not intended to be limited to the particular examples disclosed and the invention covers all modifications, equivalents, and alternatives falling within the spirit and scope of the invention as defined by the claims.

Figure 4:
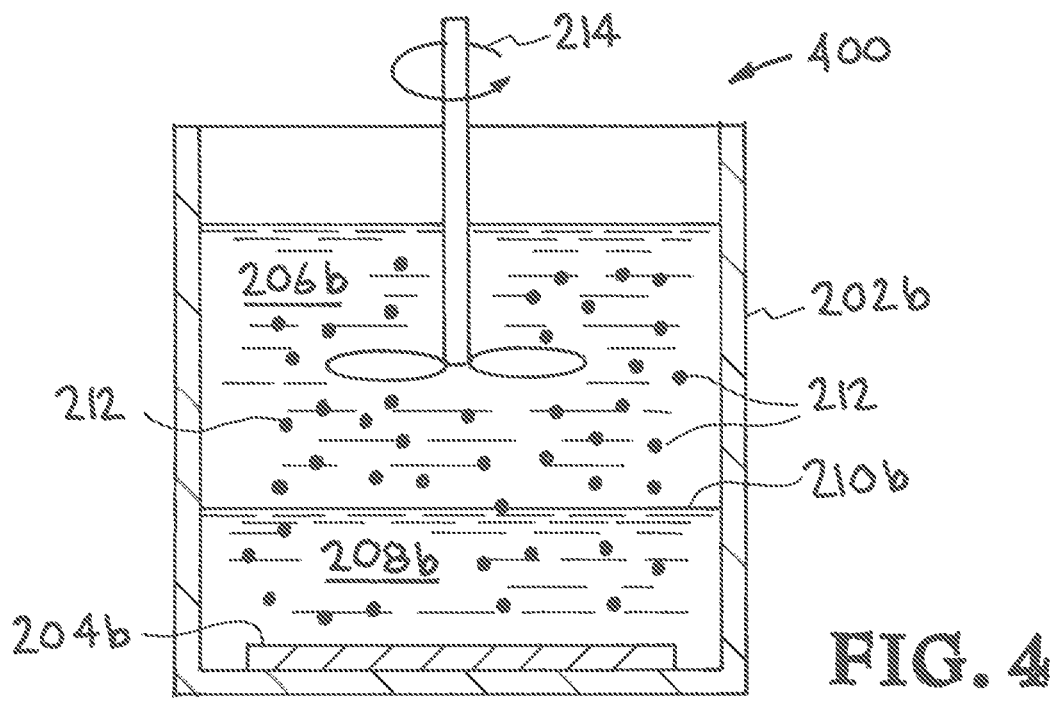
FIG. 4 is a simplified schematic depiction that provides a more detailed illustration and description of the second embodiment illustrated in FIG. 2B and described in step #3 of the flowchart of FIG. 1.
Figure 5A:
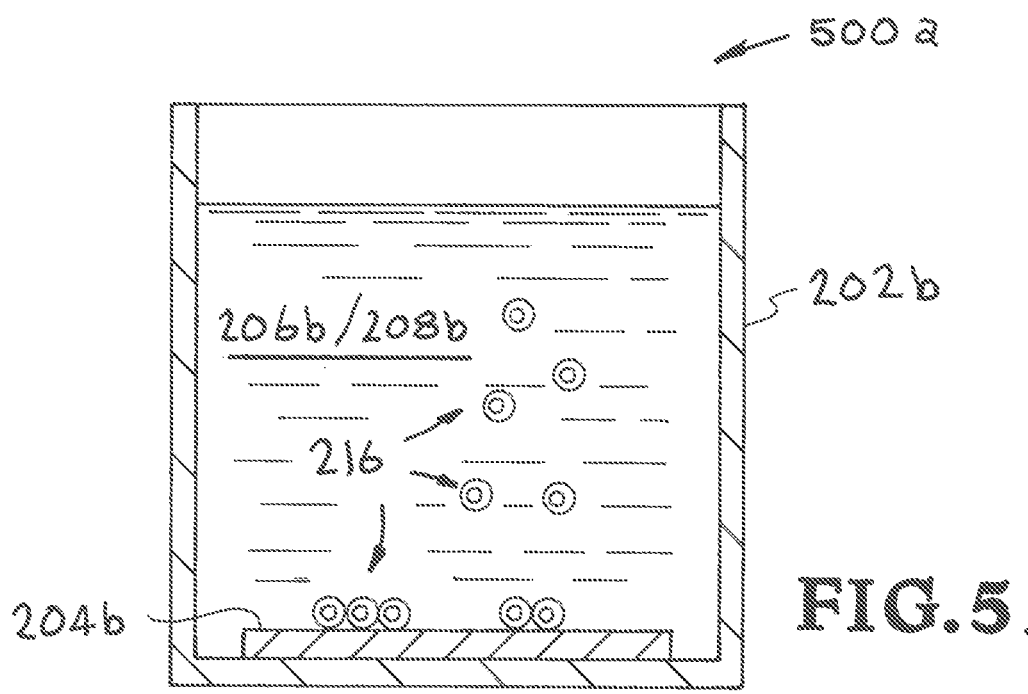
FIG. 5A illustrates colloidosomes migrating to the substrate.
Figure 5B:
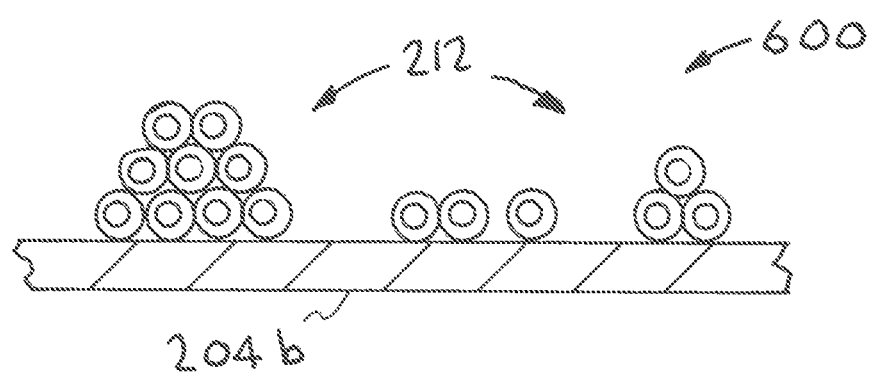
FIG. 5B illustrates a portion of the substrate with a dried layer of colloidosomes forming a film.

Referring now to the drawings and in particular to FIG. 1, a flow chart provides one illustrative example embodiment of the inventor's apparatus, systems, and methods. This embodiment is designated generally by the reference numeral 100. The embodiment 100 includes the following steps:

Step #1 (102)—Select two immiscible solvents one or both containing nanocrystals. Two examples of solvents are oil and water and hexane and methanol. (See FIG. 2A and FIG. 2B);

Step #2 (104)—Into a suitable vessel add the solvents of step 1. An alternative method is to add nanocrystals to solvents not containing nanocrystals (See FIG. 3);

Step #3 (106)—A shear force is applied to the mixtures of Step 2 (See FIG. 4);

Step #4 (108)—The nanocrystals irreversibly adsorb and self-assemble at the interface to form colloidosomes. (See FIG. 5A);

Step #5 (110)—After evaporation of the fluids a dried microcapsule (colloidosomes) film will be formed on the substrate/interface (See FIG. 5B).

Figure 2A:
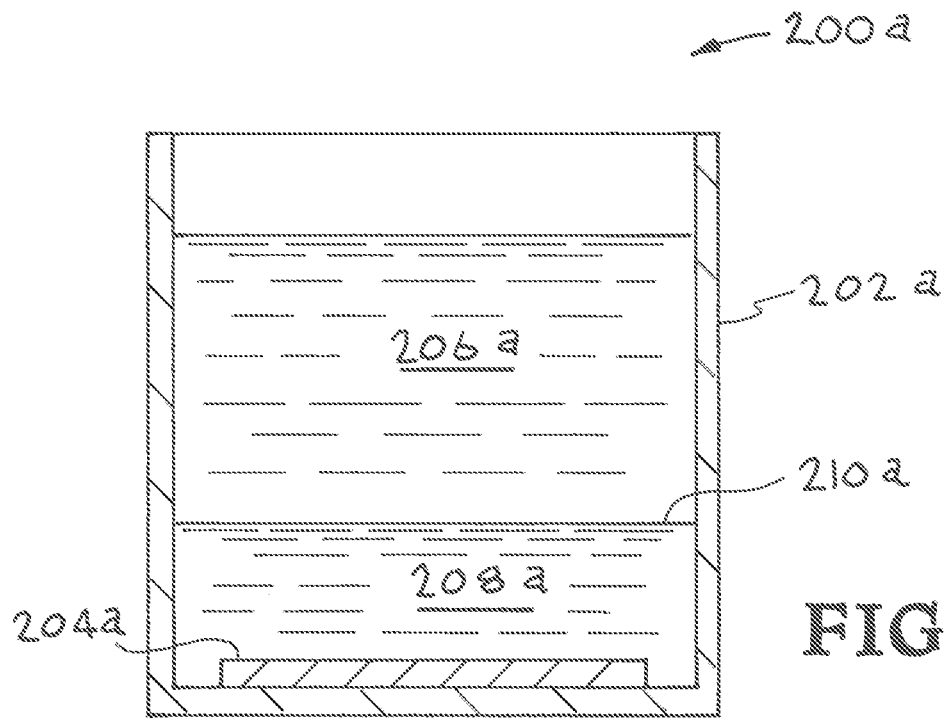
FIG. 2A is a simplified schematic depiction that illustrates a first embodiment of the inventor's apparatus, systems, and methods.

Referring now to FIG. 2A, a simplified schematic depiction illustrates a first embodiment of the inventor's apparatus, systems, and methods. This first embodiment is designated generally by the reference numeral 200a. This first embodiment 202a provides a more detailed illustration and description of Step #1 of the flowchart 100 of FIG. 1. As illustrated, the embodiment 200a includes a number of components. The components of the inventor's apparatus, systems, and methods 202a illustrated in FIG. 2A are identified and described below.

Reference Numeral 202a—Vessel
Reference Numeral 204a—Substrate/Interface
Reference Numeral 206a—Oil
Reference Numeral 208a—Water
Reference Numeral 212a—Boundary The description of the first embodiment 202a components illustrated in FIG. 2A having been completed, the operation and additional description of the inventor's first embodiment 202a will now be considered in greater detail. The substrate 204a is located in the lower portion of vessel 202a and the vessel 202a is oriented with gravity aligned to the lower portion of the vessel 202a. Two immiscible fluids are introduced into the vessel 202a. A boundary 212a separates the two immiscible fluids 206a and 208a in the vessel 202a. In the inventor's first embodiment 202a the two immiscible fluids are oil 206a and water 208a. The boundary 212a separates oil 206a and water 208a in the vessel 202a.

Figure 2B:
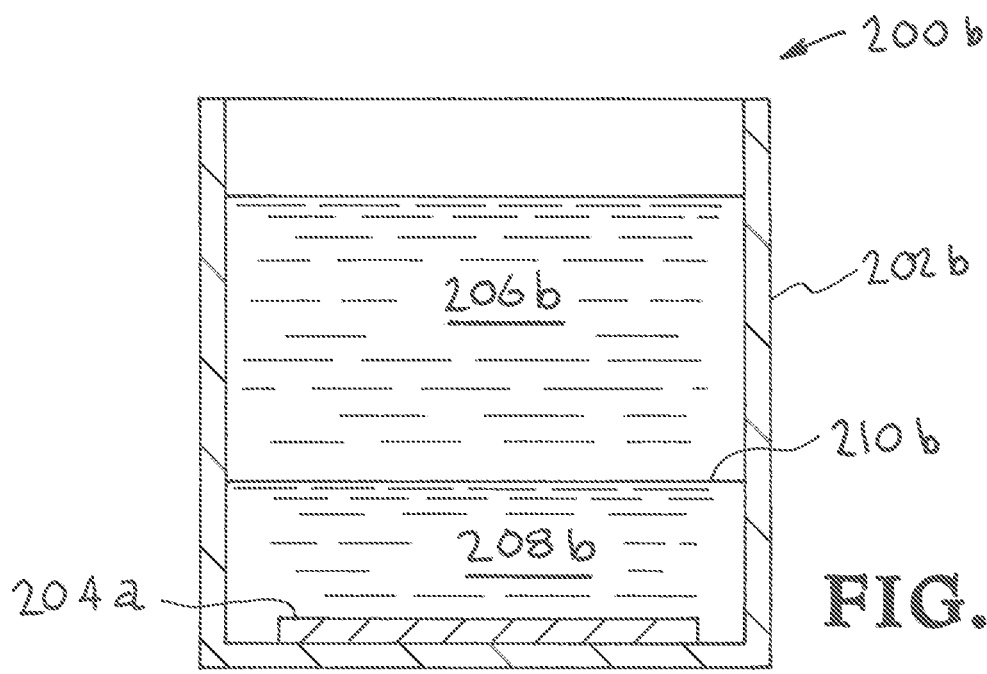
FIG. 2B is another simplified schematic depiction that illustrates a second embodiment of the inventor's apparatus, systems, and methods.

Referring now to FIG. 2B, another simplified schematic depiction illustrates a second embodiment of the inventor's apparatus, systems, and methods. This second embodiment is designated generally by the reference numeral 200b. This second embodiment 200b provides a more detailed illustration and description of Step #1 of the flowchart 100 of FIG. 1. As illustrated, the embodiment 200b includes a number of components. The components of the inventor's apparatus, systems, and methods 200b illustrated in FIG. 2B are identified and described below.

Reference Numeral 202b—Vessel
Reference Numeral 204b—Substrate/Interface
Reference Numeral 206b—Hexane
Reference Numeral 208b—Methanol
Reference Numeral 210b—Boundary The description of the second embodiment 200b components illustrated in FIG. 2B having been completed, the operation and additional description of the inventor's first embodiment 200b will now be considered in greater detail. The substrate 204b is located in the lower portion of vessel 202b and the vessel 202b is oriented with gravity aligned to the lower portion of the vessel 202b. Two immiscible fluids are introduced into the vessel 202b. A boundary 210b separates the two immiscible fluids 206b and 208b in the vessel 202b. In the inventor's second embodiment 200b the two immiscible fluids are hexane 206b and methanol 208b. The boundary 210b separates hexane 206b and methanol 208b in the vessel 202b.

Figure 3:
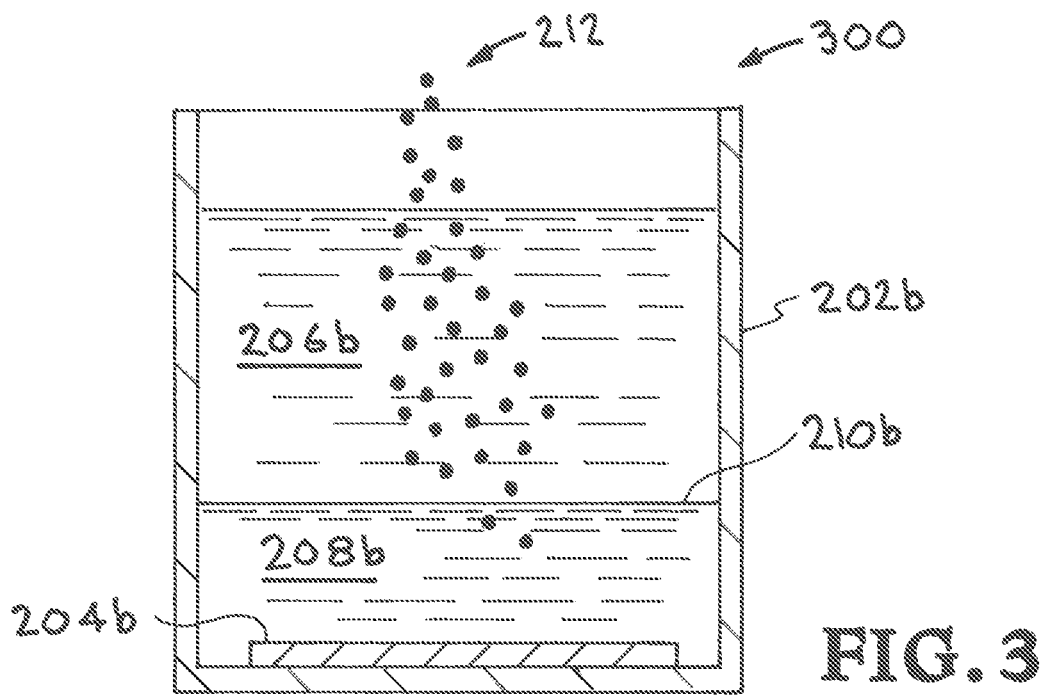
FIG. 3 illustrates an alternative method of introducing nanocrystals into solvents that do not already contain nanocrystals.

Referring now to FIG. 3, a simplified schematic depiction illustrates an alternative method of introducing nanocrystals into the solutions of solvents in FIGS. 2A and 2B. The components shown in FIG. 3 are the same as those of FIGS. 2A and 2B. The difference here is the adding of nanocrystals 212 to solutions not already containing the nanocrystals.

Referring now to FIG. 4, a simplified schematic depiction provides a more detailed illustration and description of the second embodiment 200b illustrated in FIG. 2B and Step #3 of the flowchart 100 of FIG. 1. This more detailed illustration and description is designated generally by the reference numeral 400. This illustration and description 400 shows Step #3 wherein a shear force is applied to the fluids in the vessel 202b. The substrate 204b is located in the lower portion of vessel 202b and the vessel 202b is oriented with gravity aligned to the lower portion of the vessel 202b. The. nanocrystals 212 are initially in the hexane 206b in the vessel 202b and the boundary 210b separates hexane 206b and methanol 208b in the vessel 202b. The shear force 214 is applied to hexane 206b and methanol 208b in the vessel 202b by creating a shear force in the vessel 202b.

Referring now to FIG. 5A, a simplified schematic depiction provides a more detailed illustration and description of the second embodiment 200b illustrated in FIG. 2B and Step #4 of the flowchart 100 of FIG. 1. This more detailed illustration and description is designated generally by the reference numeral 500a. This illustration and description 502a shows Step #4 wherein the nanocrystals irreversibly adsorb and self-assemble at the interface to form colloidosomes. The substrate 204b is located in the lower portion of vessel 202b and the vessel 202b is oriented with gravity aligned to the lower portion of the vessel 202b. The shear force 214 is applied to hexane 206b and ethanol 208b in the vessel 202b and the nanocrystals 212 irreversibly adsorb and self-assemble at the interface 206b/208b and form colloidosomes 216.

FIG. 5B illustrates that after evaporation of the fluids a dried microcapsule (colloidosomes) film or material will be formed on the substrate 204b.

Referring now to FIGS. 6A, 6B, 6C, and 6D; examples of various colloidosome structures and combination of colloidosome structures to form embodiments of the inventor's apparatus, systems, and methods. The embodiments of the colloidosome structures and combination of colloidosome structures provide nanocrystals of a single material, nanocrystals of combinations of nanocrystals materials, colloidosomes with single layers of nanocrystals, and colloidosomes multiple layers of nanocrystals.

Referring now to FIG. 6A, a simplified schematic description illustrates a half section cross section of a colloidosome 600A showing nanocrystals 602 with ligands 604 that help to form the colloidosome.

Referring now to FIG. 6B, a simplified schematic depiction provides a more detailed illustration and description of one embodiment 600b of the colloidosomes being collected on the substrate. The colloidosome 600b is composed of two different nanocrystal materials 606 and 608.

Referring now to FIG. 6C, a simplified schematic depiction provides a more detailed illustration and description of one embodiment 600c of the colloidosomes being collected on the substrate. The colloidosome 600c is composed of two layers, an inner layer 610 and an outer layer 612.

Referring now to FIG. 6D, a simplified schematic depiction provides a more detailed illustration and description of one embodiment 600d of the colloidosomes being collected on the substrate. The colloidosome 600d is composed of two different nanocrystal materials 614 and 616 randomly dispersed in either layer.

Figure 7:
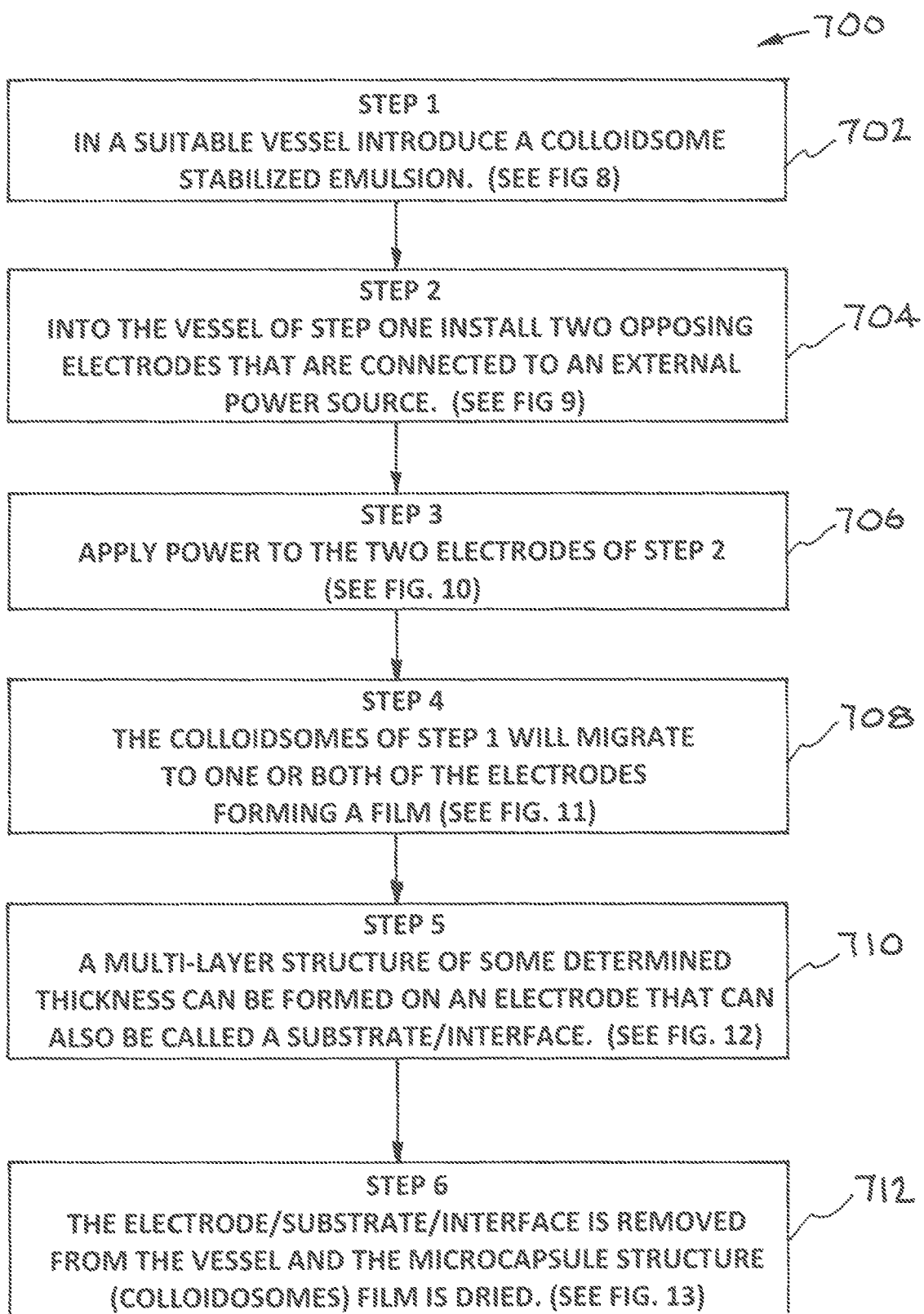
FIG. 7 is a flow chart that provides another illustrative example embodiment of the inventor's apparatus, systems, and methods.

Referring now to FIG. 7, a flow chart provides another illustrative example embodiment of the inventor's apparatus, systems, and methods. This embodiment is designated generally by the reference numeral 700. The embodiment 700 includes the following steps:

Step #1 (702)—Into a suitable vessel introduce a colloidosome stabilized emulsion. (See FIG. 8);

Step #2 (704)—Into the vessel of step one install two opposing electrodes that are connected to an external power source. (See FIG. 9);

Step #3 (706)—Apply power to the two electrodes of step 2. (See FIG. 10);

Step #4 (708)—The colloidosomes of step one will migrate to one or both of the electrodes forming hollow sphere nanocrystal structures (colloidosomes). (See FIG. 11);

Step #5 (710)—Multi-layer structure of some determined thickness can be formed on an electrode that can also be called a substrate/interface. (See FIG. 12).

Step #6 (712)—The electrode/substrate/interface is removed from the vessel and the microcapsule structure (colloidosomes) film is dried. (See FIG. 13).

Figure 8:
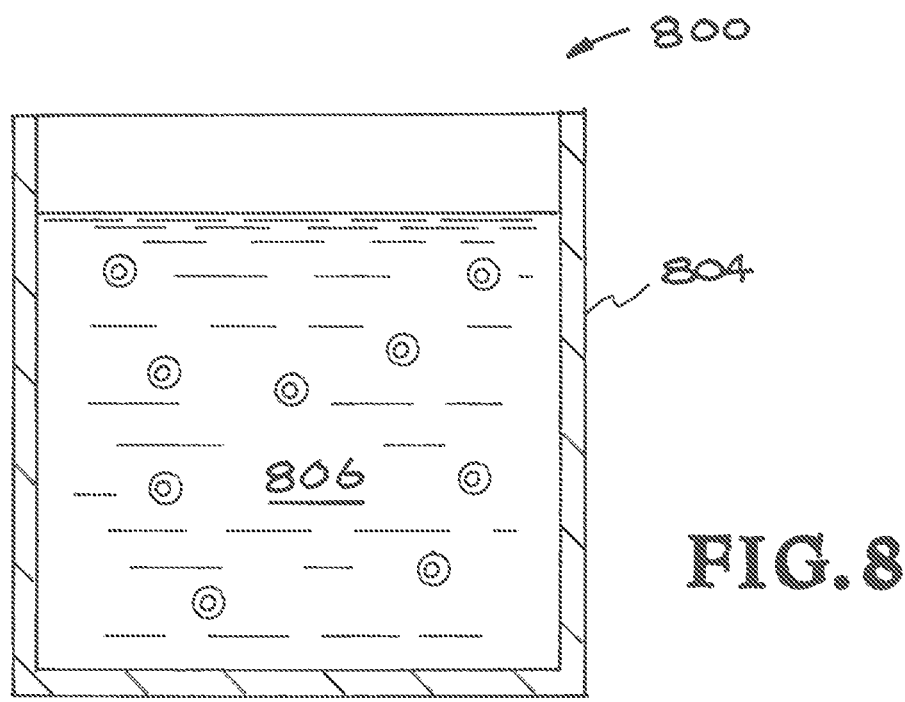
FIG. 8 is a simplified schematic depiction that illustrates an embodiment of the inventor's apparatus, systems, and methods.

Referring now to FIG. 8, a simplified schematic depiction illustrates an embodiment of the inventor's apparatus, systems, and methods. This embodiment is designated generally by the reference numeral 800. This embodiment 800 provides a more detailed illustration and description of Step #1 of the flowchart 700 of FIG. 7. As illustrated, the embodiment 700 includes a number of components. The components of the inventor's apparatus, systems, and methods 800 illustrated in FIG. 8 are identified and described below.

Reference Numeral 804—Vessel
Reference Numeral 806—Colloidosomes stabilized emulsion The description of the embodiment 800 components illustrated in FIG. 8 having been completed, the operation and additional description of the inventor's embodiment 800 will now be considered in greater detail. A nanocrystal stabilized emulsion 806 is introduced into the vessel 804. The nanocrystal stabilized emulsion 806 can be produce as illustrated in FIGS. 1-5 and described above.

Figure 9:
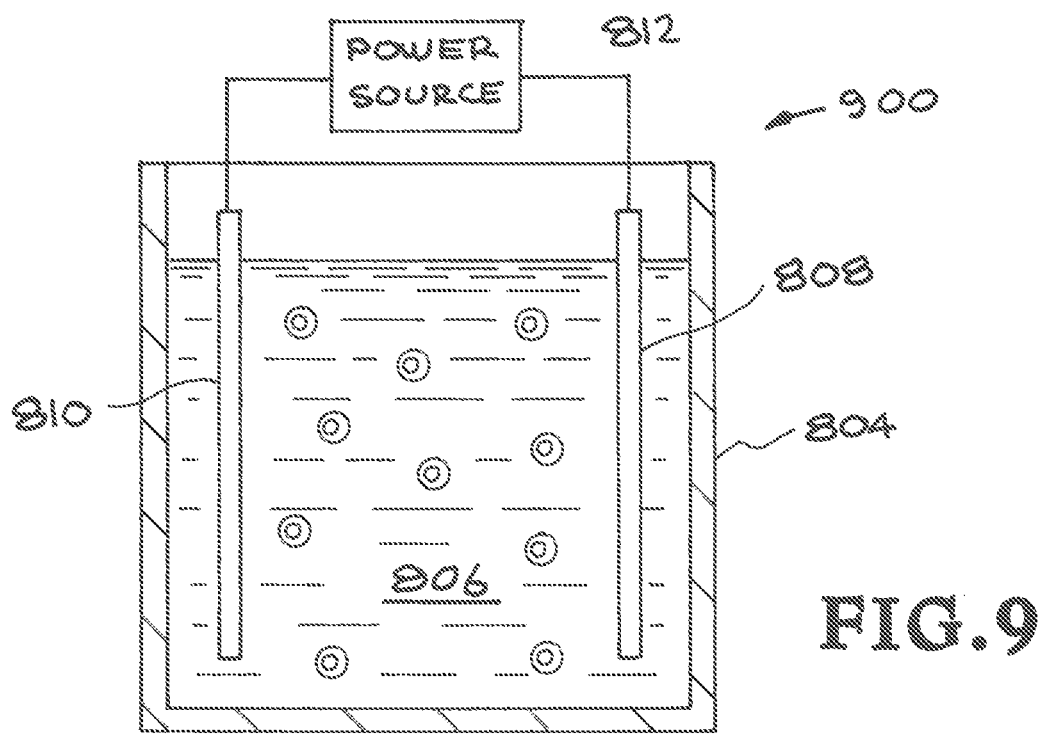
FIG. 9 is a simplified schematic depiction illustrating the inventor's apparatus, systems, and methods.

Referring now to FIG. 9, a simplified schematic depiction illustrates the inventor's apparatus, systems, and methods. This depiction is designated generally by the reference numeral 900. This depiction 900 provides a more detailed illustration and description of Step #2 of the flowchart 700 of FIG. 7. As illustrated, the embodiment 900 includes a number of components. The components illustrated in FIG. 9 are identified and described below.

Reference Numeral 806—Colloidosomes stabilized emulsion
Reference Numeral 808—Electrode
Reference Numeral 810—Electrode
Reference Numeral 812—External power source The description of the components illustrated in FIG. 9 having been completed, the operation will now be considered. Into the vessel 804 of step one install two opposing electrodes 808 and 810 that are connected to an external power source 812.

Figure 10:
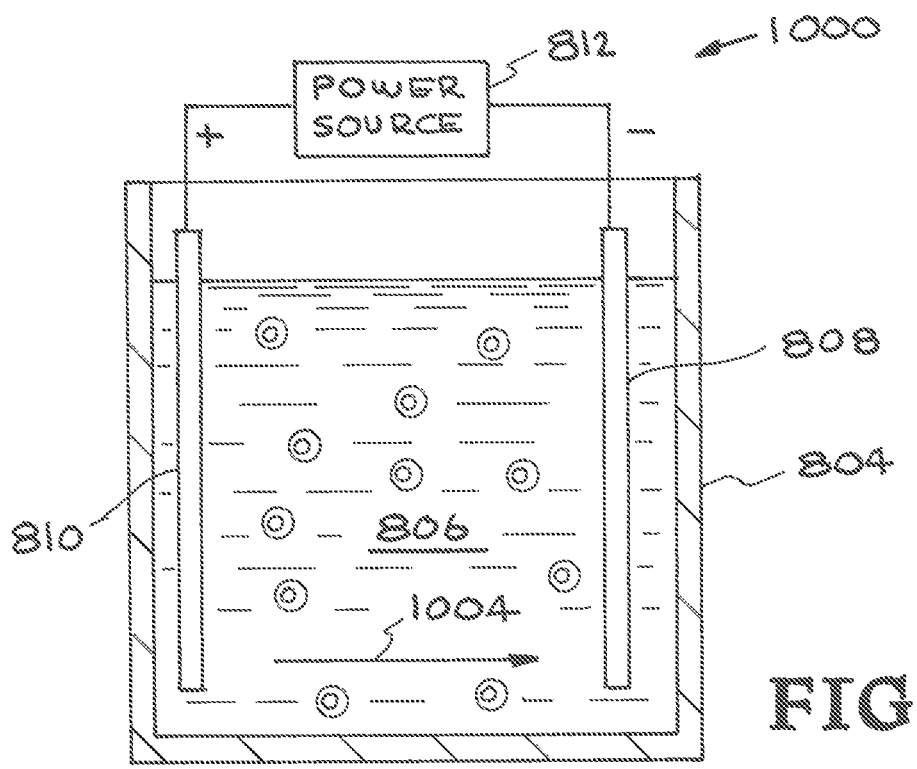
FIG. 10 is a simplified schematic depiction that illustrates the inventor's apparatus, systems, and methods.

Referring now to FIG. 10, a simplified schematic depiction illustrates the inventor's apparatus, systems, and methods. This depiction is designated generally by the reference numeral 1000. This depiction 1000 provides a more detailed illustration and description of Step #3 of the flowchart 700 of FIG. 7. As illustrated, the embodiment 1000 includes a number of components. The components illustrated in FIG. 10 are identified and described below.

Reference Numeral 804—Vessel
Reference Numeral 806—Colloidosomes stabilized emulsion
Reference Numeral 808—Electrode
Reference Numeral 810—Electrode
Reference Numeral 812—External power source
Reference Numeral 1004—Direction of e-field The description of the components illustrated in FIG. 10 having been completed, the operation will now be considered. Into the vessel 804 of step one install two opposing electrodes 808 and 810 that are connected to an external power source 812. Power is applied to the two electrodes 808 and 810. The direction of the e-field is indicated by the arrow 1004.

Figure 11:
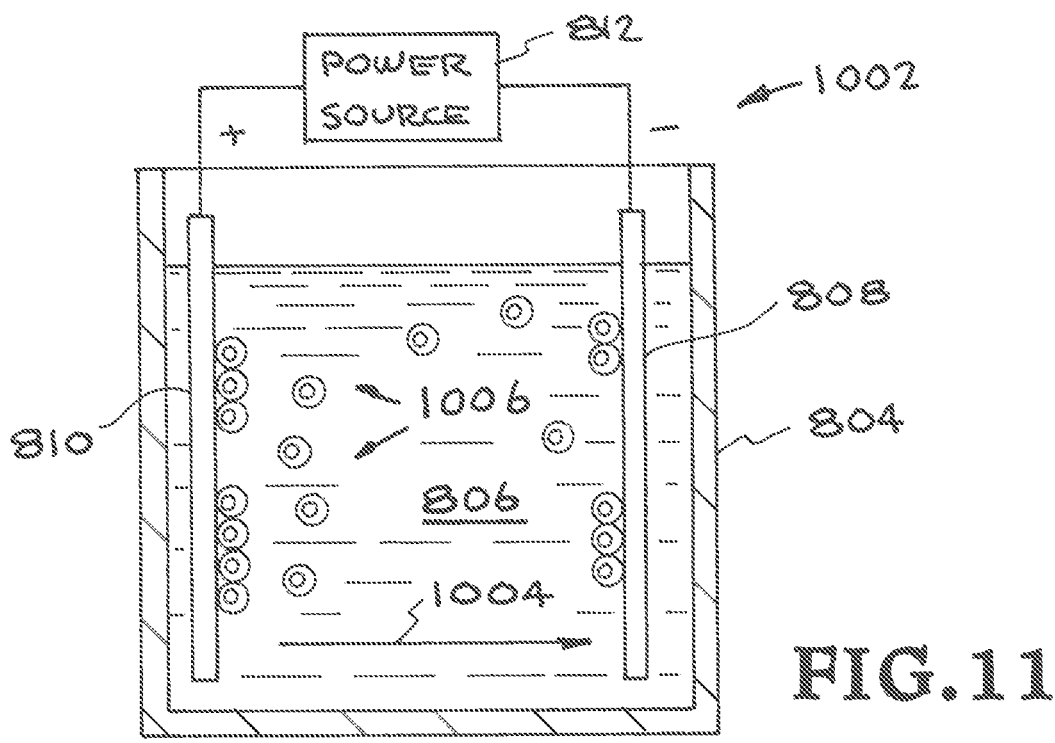
FIG. 11 is a simplified schematic depiction that illustrates the inventor's apparatus, systems, and methods.

Referring now to FIG. 11, a simplified schematic depiction illustrates the inventor's apparatus, systems, and methods. This depiction is designated generally by the reference numeral 1002. This depiction 1002 provides a more detailed illustration and description of Step #4 of the flowchart 700 of FIG. 7. As illustrated, the embodiment 1002 includes a number of components. The components illustrated in FIG. 11 are identified and described below.

Reference Numeral 804—Vessel
Reference Numeral 806—Colloidosomes stabilized emulsion
Reference Numeral 808—Electrode
Reference Numeral 810—Electrode
Reference Numeral 812—External power source
Reference Numeral 1004—Direction of e-field
Reference Numeral 1006—Colloidosomes migrating to electrode/substrate The description of the components illustrated in FIG. 11A having been completed, the operation will now be considered. Into the vessel 804 of step one install two opposing electrodes 808 and 810 that are connected to an external power source 812. Power is applied to the two electrodes 808 and 810. The direction of the e-field is indicated by the arrow 1004. The electrode 810 is also a substrate. The colloidosomes will migrate to one or both of the electrode/substrate 810 forming hollow sphere nanocrystal structures (colloidosomes).

Figure 12:
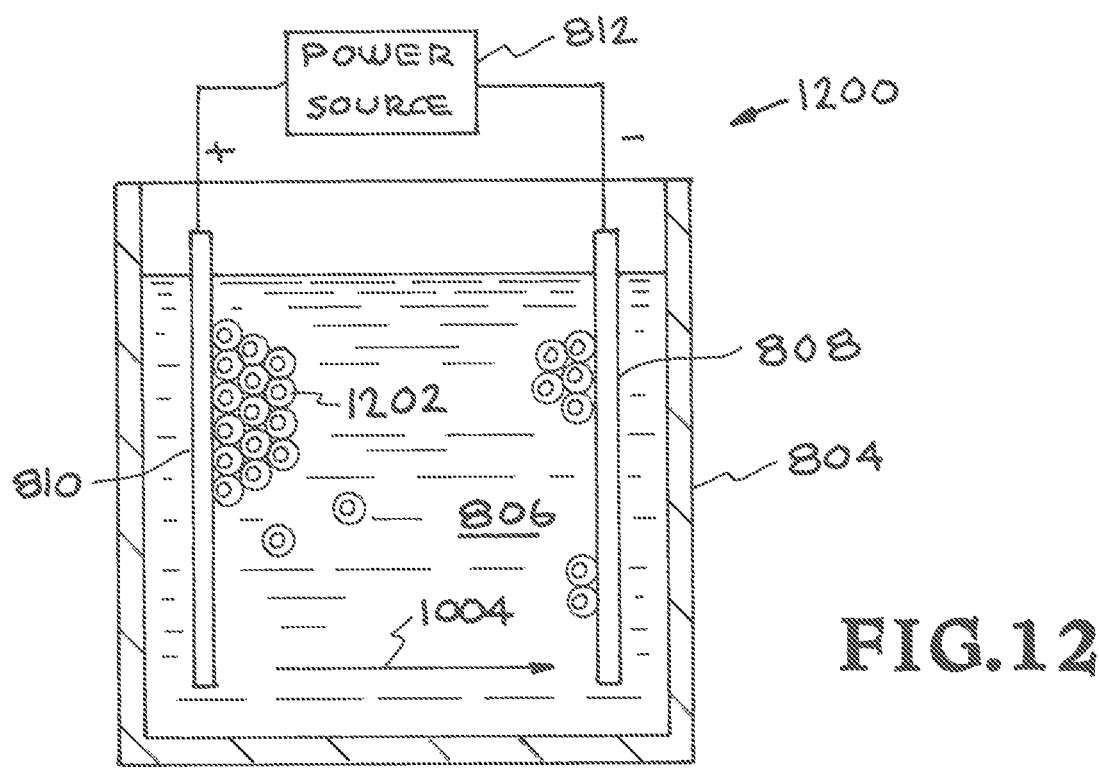
FIG. 12 is a simplified schematic depiction illustrating the inventor's apparatus, systems, and methods.

Referring now to FIG. 12, a simplified schematic depiction illustrates the inventor's apparatus, systems, and methods. This depiction is designated generally by the reference numeral 1200. This depiction 1200 provides a more detailed illustration and description of Steps #4 and #5 of the flowchart 700 of FIG. 7. As illustrated, the embodiment 1200 includes a number of components. The components illustrated in FIG. 12 are identified and described below.

Reference Numeral 804—Vessel
Reference Numeral 806—Colloidosomes stabilized emulsion
Reference Numeral 808—Electrode
Reference Numeral 810—Electrode
Reference Numeral 812—External power source
Reference Numeral 1004—Direction of e-field
Reference Numeral 1202—Colloidosomes have migrating to electrode/substrate The description of the components illustrated in FIG. 12 having been completed, the operation will now be considered. Into the vessel 804 of step one install two opposing electrodes 808 and 810 that are connected to an external power source 812. Power is applied to the two electrodes 808 and 810. The direction of the e-field is indicated by the arrow 1004. The electrode 810 is also a substrate. The colloidosomes 1202 will migrate to one or both of the electrode/substrate 810 forming hollow sphere colloidosomes structures.

Figure 13:
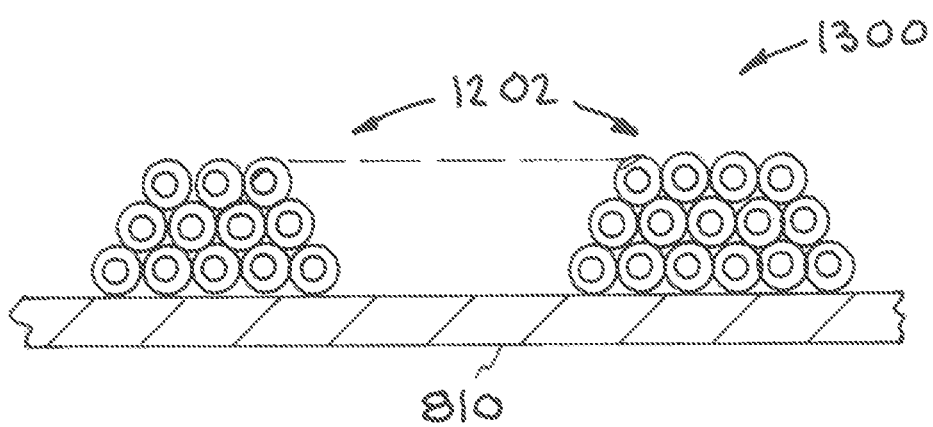
FIG. 13 is a simplified schematic depiction provides an illustration of colloidosome collected on an electrode/substrate.

Referring now to FIG. 13, a simplified schematic depiction illustrates the inventor's apparatus, systems, and methods. This depiction is designated generally by the reference numeral 1300. As illustrated, the embodiment 1300 includes a number of components. The components illustrated in FIG. 13 are identified and described below.

Reference Numeral 1202—Colloidosomes have migrating to electrode/substrate 810.

The nanocrystals form colloidosomes 1202 assemble at the substrate 810.

Figure 14:
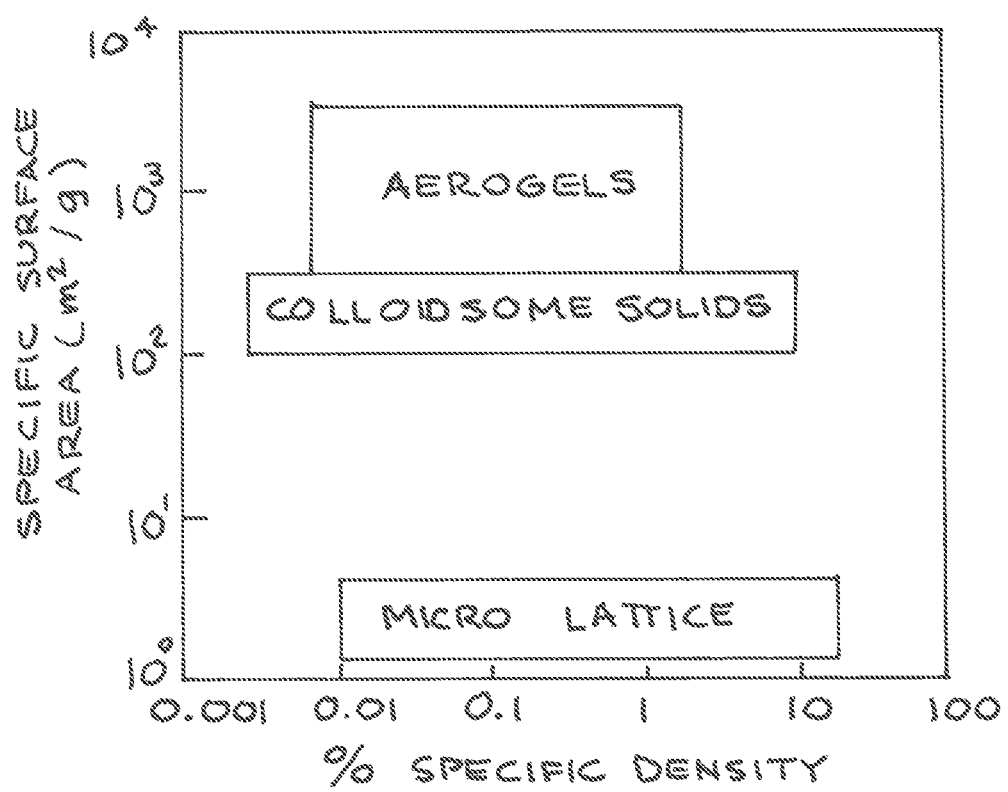
FIG. 14 is a graph illustrating specific density and surface area ranges of the inventor's apparatus, systems, and methods.

Referring now to FIG. 14, a chart provides additional information and a description of the term "ultra-low density." Specific density and surface area ranges are shown for the inventors' materials assuming a monolayer coating of nanoparticles. Vertical lines represent world record low densities achieved by aerogels. Typical hydrotreating catalysts are in the colloidosome solids Range (200-250 m2/g).

The inventor's apparatus, systems, and methods will now be described by way of non-limitative examples which illustrate individual embodiments of the inventor's apparatus, systems, and methods.

Example 1

The inventors have performed proof-of-principle experiments to demonstrate the process. In the proof-of-principle experiment the inventors made an emulsion using ~20 nm samarium cobalt oxide nanocrystals with oleic acid ligands to stabilize methanol droplets ~200-500 nm in diameter within a hexane matrix. The colloidosome-stabilized droplets remained intact as they were electrophoretically deposited onto a substrate. The hollow colloidosome shells remained intact as the methanol and hexane evaporated. This process, which took less than 5 minutes, created an ~2.5 micron thick conformal film that covered the electrode surface (cm×cm area).

Example 2

The inventors have subsequently demonstrated (May 2017) that they can also make and deposit nickel nanocrystal colloidosome films. Further, the inventors have demonstrated that the colloidosomes do not collapse when ligands are removed using pulses of light. The invented method is estimated to make porous solids with specific surface areas 100-250 m2/g and % specific densities that span 0.01% to 10%.

The inventor's apparatus, systems, and methods are described and illustrated by examples of apparatus, systems, and methods constructed in accordance with the present invention. The scope of the invention is not intended to be limited to the particular examples disclosed and the invention covers all modifications, equivalents, and alternatives falling within the spirit and scope of the invention as defined by the claims.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will, be appreciated that the scope of the present writing fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein.

However, it should be understood that the application is not intended to be limited to the particular forms disclosed. Rather, the application is to cover all modifications, equivalents, and alternatives falling within the scope of the application as defined by the following appended claims.

All elements, parts, and steps described herein are preferably included. It is to be understood that any of these elements, parts and steps may be replaced by other elements, parts and steps or deleted altogether as will be obvious to those skilled in the art.

Broadly, this writing discloses at least the following: An ultra low density film and an ultra low density solid material are produced by the steps of providing, a vessel, introducing two immiscible fluids into the vessel, adding nanocrystals to at least one of the two immiscible fluids, applying a shear force to the two immiscible fluids and the nanocrystals in a manner that causes the nanocrystals to self-assemble and form colloidosomes. The colloidosomes amass and evaporation of the two fluids produces dried colloidosomes. The ultra low density self-assembled colloidosomes are hollow self-assembled colloidosomes, which are formed into the ultra-low density film and the ultra-low density solid.

CONCEPTS

This writing also presents at least the following concepts:

1. A method of making a film or a solid material, comprising the steps of:
   providing a vessel,
   introducing two immiscible fluids into said vessel,
   nanocrystals contained in at least one of said two immiscible fluids,
   applying a shear force to said two immiscible fluids and said nanocrystals in a manner that causes said nanocrystals to self-assemble and form colloidosomes,
   enabling said colloidosomes to amass, and
   removing said two immiscible fluids to produce dried colloidosomes and make the film or the solid material.

2. The method of making a film or a solid material of concept 1 wherein said vessel has a lower portion and wherein said vessel is oriented with gravity aligned to said lower portion of said vessel allowing said colloidosomes to amass in said lower portion of said vessel.

3. The method of making a film or a solid material of concepts 1 and 2 wherein said step of enabling said colloidosomes to amass comprises providing a first electrode in said vessel, providing a second electrode in said vessel, and energizing said first electrode and said second electrode to cause said colloidosomes to migrate to said first electrode and produce a colloidosomes accumulate on said first electrode.

4. The method of making a film or a solid material of concepts 1, 2 and 3 wherein said step of removing said two immiscible fluids to produce dried colloidosomes comprises allowing evaporation of said two immiscible fluids to produce dried colloidosomes.

5. The method of making a film or a solid material of concepts 1, 2, 3, and 4 wherein said two immiscible fluids are oil and water.

6. The method of making a film or a solid material of concepts 1, 2, 3, 4, and 5 wherein said two immiscible fluids are hexane and methanol.

7. The method of making a film or a solid material of concepts 1, 2, 3, 4, 5, and 6 wherein said nanocrystals are metal nanocrystals.

8. The method of making a film or a solid material of concepts 1, 2, 3, 4, 5, 6, and 7 wherein said nanocrystals are oxide nanocrystals.

9. The method of making a film or a solid material of concepts 1, 2, 3, 4, 5, 6, 7, and 8 wherein said nanocrystals are organic nanocrystals.

10. The method of making a film or a solid material of concepts 1, 2, 3, 4, 5, 6, 7, 8, and 9 wherein said nanocrystals are nanocrystals composed of oxides, metals, semiconductors, and organics, and combinations of oxides, metals, semiconductors, and organics.

11. The method of making a film or a solid material of concepts 1, 2, 3, 4, 5, 6, 7, 8, 9, and 10 wherein said step of enabling said colloidosomes to amass comprises enabling said colloidosomes to amass and form a single layer of colloidosomes.

12. The method of making a film or a solid material of concepts 1, 2, 3, 4, 5, 6, 7, 8, 9, 10, and 11 wherein said step of enabling said colloidosomes to amass comprises enabling said colloidosomes to amass and form multiple layers of colloidosomes.

13. The method of making a film or a solid material of concepts 1, 2, 3, 4, 5, 6, 7, 8, 9, 10, 11, and 12 wherein said step of adding nanocrystals to at least one of said two immiscible fluids comprises adding nanocrystals of a first material to at least one of said two immiscible fluids and adding nanocrystals of a second material to at least one of said two immiscible fluids wherein said first material and said second material are different materials and wherein said dried colloidosomes include both nanocrystals of a first material and nanocrystals of a second material.

14. A method of making a film or a solid material, comprising the steps of:
   providing a vessel;
   providing a stabilized emulsion, wherein said step of providing a stabilized emulsion includes providing two immiscible fluids with nanocrystals in at least one of said two immiscible fluids, applying a shear force to said two immiscible fluids and said nanocrystals in a manner that causes said nanocrystals to self-assemble and form colloidosomes;
   providing said stabilized emulsion in said vessel;
   providing a first electrode in said vessel;
   providing a second electrode in said vessel;
   energizing said first electrode and said second electrode to charge said colloidosomes causing said colloidosomes to migrate to said first electrode and produce a colloidosomes accumulate on said first electrode;
   enabling said colloidosomes to amass, and
   removing said two immiscible fluids to produce dried colloidosomes and make the film or the solid material.

15. The method of making a film or a solid material of concept 14 wherein said step of enabling said colloidosomes to amass comprises enabling said colloidosomes to amass and form a single layer of colloidosomes.

16. The method of making a film or a solid material of concepts 14 and 15 wherein said step of enabling said colloidosomes to amass comprises enabling said colloidosomes to amass and form multiple layers of colloidosomes.

17. The method of making a film or a solid material of concepts 14, 15, and 16 wherein said step of providing two immiscible fluids with nanocrystals in at least one of said two immiscible fluids comprises providing two immiscible fluids with nanocrystals of a first material in at least one of said two immiscible fluids and providing two immiscible fluids with nanocrystals of a second material in at least one of said two immiscible fluids wherein said first material and said second material are different materials.

18. A film or a solid material product, comprising:
self-assemble colloidosomes that form a film or solid material product.

19. The film or a solid material product of concept 18 wherein said self-assemble colloidosomes are hollow self-assembled colloidosomes.

20. The film or a solid material product of concepts 18 and 19 wherein the film is made of hollow self-assemble colloidosomes that form a single layer of colloidosomes.

21. The film or a solid material product of concepts 18, 19, and 20 wherein the film is made of hollow self-assemble colloidosomes that form multiple layers of colloidosomes.

22. The film or a solid material product of concepts 18, 19, 20, and 21 wherein the film is made of hollow self-assemble colloidosomes that include both nanocrystals of a first material and nanocrystals of a second material.

23. The film or a solid material product of concepts 18, 19, 20, 21, and 22 wherein the solid material product is made of hollow self-assemble colloidosomes that form multiple layers of colloidosomes.

24. The film or a solid material of concepts 18, 19, 20, 21, 22, and 23 wherein the solid material product is made of hollow self-assemble colloidosomes that include both nanocrystals of a first material and nanocrystals of a second material.

The invention claimed is:

1. A method of making a film or a solid material, comprising the steps of:
providing a vessel having a vessel lower portion oriented and aligned with gravity,
providing a surface in said vessel lower portion,
introducing two immiscible fluids into said vessel,
nanocrystals contained in at least one of said two immiscible fluids,
applying a shear force to said two immiscible fluids and said nanocrystals in a manner that causes said nanocrystals to self-assemble and form colloidosomes, and
evaporating or removing said two immiscible fluids enabling said colloidosomes to amass on said surface in said vessel lower portion to produce dried colloidosomes and make the film or the solid material.

2. The method of making a film or a solid material of claim 1 wherein said vessel lower portion is oriented with gravity aligned to said lower portion allowing said colloidosomes to amass in said lower portion of said vessel on said surface in said vessel lower portion.

3. The method of making a film or a solid material of claim 1 wherein said step of providing a surface in said vessel lower portion comprises providing a substrate with said surface in said vessel lower portion.

4. The method of making a film or a solid material of claim 1 wherein said step of removing said two immiscible fluids to produce dried colloidosomes comprises allowing evaporation of said two immiscible fluids to produce dried colloidosomes.

5. The method of making a film or a solid material of claim 1 wherein said two immiscible fluids are oil and water.

6. The method of making a film or a solid material of claim 1 wherein said two immiscible fluids are hexane and methanol.

7. The method of making a film or a solid material of claim 1 wherein said nanocrystals are metal nanocrystals.

8. The method of making a film or a solid material of claim 1 wherein said nanocrystals are oxide nanocrystals.

9. The method of making a film or a solid material of claim 1 wherein said nanocrystals are organic nanocrystals.

10. The method of making a film or a solid material of claim 1 wherein said nanocrystals are nanocrystals composed of oxides, metals, semiconductors, and organics, and combinations of oxides, metals, semiconductors, and organics.

11. The method of making a film or a solid material of claim 1 wherein said step of evaporating or removing said two immiscible fluids enabling said colloidosomes to amass comprises enabling said colloidosomes to amass and form a single layer of colloidosomes.

12. The method of making a film or a solid material of claim 1 wherein said step of evaporating or removing said two immiscible fluids enabling said colloidosomes to amass comprises enabling said colloidosomes to amass and form multiple layers of colloidosomes.

13. The method of making a film or a solid material of claim 1 wherein said nanocrystals contained in at least one of said two immiscible fluids are obtained by adding nanocrystals of a first material to at least one of said two immiscible fluids and adding nanocrystals of a second material to at least one of said two immiscible fluids wherein said first material and said second material are different materials and wherein said dried colloidosomes include both nanocrystals of a first material and nanocrystals of a second material.

14. A method of making a film or a solid material, comprising the steps of:
providing a vessel;
providing a stabilized emulsion, wherein said step of providing a stabilized emulsion includes providing two immiscible fluids with nanocrystals in at least one of said two immiscible fluids, applying a shear force to said two immiscible fluids and said nanocrystals in a manner that causes said nanocrystals to self-assemble and form colloidosomes;
providing said stabilized emulsion in said vessel;
providing a first electrode in said vessel;
providing a second electrode in said vessel;
providing a power source connected to said first electrode and connected to said second electrode;
energizing said first electrode and said second electrode using said power source to charge said colloidosomes causing said colloidosomes to migrate to said first electrode and produce a colloidosomes accumulate on said first electrode;
enabling said colloidosomes to amass and form a colloidosomes structure on said first electrode, and
removing said colloidosomes structure from said first electrode to produce dried colloidosomes and make the film or the solid material.

15. The method of making a film or a solid material of claim 14 wherein said step of enabling said colloidosomes to amass and form a colloidosomes structure on said first electrode comprises enabling said colloidosomes to amass and form a single layer of colloidosomes on said first electrode.

16. The method of making a film or a solid material of claim 14 wherein said step of enabling said colloidosomes to amass and form a colloidosomes structure on said first electrode comprises enabling said colloidosomes to amass and form multiple layers of colloidosomes on said first electrode.

17. The method of making a film or a solid material of claim 14 wherein said step of providing two immiscible fluids with nanocrystals in at least one of said two immiscible fluids comprises providing two immiscible fluids with nanocrystals of a first material in at least one of said two immiscible fluids and providing two immiscible fluids with nanocrystals of a second material in at least one of said two immiscible fluids wherein said first material and said second material are different materials.

* * * * *